3,418,201
POLYCHLOROPRENE-FLUOROELASTOMER
COMPOSITE ARTICLES
John Michael Bowman, Wilmington, Del., assignor to E. I.
du Pont de Nemours and Company, Wilmington, Del.,
a corporation of Delaware
No Drawing. Filed Apr. 28, 1965, Ser. No. 451,669
4 Claims. (Cl. 161—184)

ABSTRACT OF THE DISCLOSURE

Process for forming a composite article of polychloroprene and a fluoroelastomer which comprises incorporating an epoxy resin and a silica filler into a polychloroprene, placing the resulting polychloroprene stock and a fluoroelastomer in physical contact and vulcanizing the resulting structure.

---

This invention relates to composite structures comprising vulcanized elastomeric polymers of chloroprene and vulcanized elastomeric copolymers of fluorine-containing olefins in adherent relation. More particularly this invention relates to a technique for providing strong bonding forces in such composite structures without the use of a separate adhesive layer in adhering the two elastomeric layers.

It is often desirable in the design and fabrication of structures of elastomeric materials to employ more than one type of elastomeric polymer in laminated relationship. For instance, wire and cable insulation is often composed of an inner layer of an elastomer with superior electrical insulating properties, and an outer layer of an elastomer with superior resistance to mechanical damage or to chemical degradation by exposure to environmental factors. It is common for hose to be made of two or more different elastomers, for similar reasons. The linings of tanks for storage and processing of chemicals are frequently a composite laminate of different elastomeric polymers.

A particularly desirable combination of elastomers for such composite structures, especially for service under highly corrosive conditions, includes a base layer of a polychloroprene, i.e., neoprene, with a surface layer of a fluoroelastomer, e.g., a copolymer of hexafluoropropene and vinylidene fluoride. This arrangement has however been subject to serious operational difficulties. Because of the widely differing chemical nature of neoprenes and fluoroelastomers, and because distinctly different vulcanizing agents must be used for each of the two types of elastomers, it has been a problem to achieve satisfactory bonding between neoprenes and fluoroelastomers in laminated structures. An operable technique for providing adequate adhesion in such structures is described in "Viton" Bulletin No. 12, May 1964, published by Elastomer Chemicals Department of E. I. du Pont de Nemours and Company. This technique employs a "tie stock" of specially compounded neoprene which is interposed between conventionally compounded neoprene and fluoroelastomer layers. In addition to the tie stock, the recommended procedure calls for coating surfaces to be joined with an epoxy resin, and also for solvent wiping of surfaces to promote adhesive bonding. This multi-step procedure, while effective, is tedious and time-consuming and costly to use on a commercial scale of operation. Also, there has been considerable need in the industry for a simpler less-involved neoprene/fluoroelastomer composite structure.

It has unexpectedly been discovered that a simple laminated composite structure may be formed by adhering together directly (a) a high molecular weight mercaptan-modified polymer of chloroprene stock having incorporated therein at least about 30 parts by weight of a silica filler and about 3–5 parts by weight of an epoxy resin and (b) a fluoroelastomer stock, and thereafter vulcanizing the composite article.

Through means of this invention, composite structures of neoprene and a fluoroelastomer can be made by simply placing in contact layers of the two elastomers compounded as indicated and then vulcanizing the layered structure. No separate tie stocks or adhesive coatings are required, and the design and fabrication of composite structures of neoprenes and fluoroelastomers is greatly facilitated. The incorporation of an epoxy resin directly in a particular type of chloroprene polymer in this manner makes possible the ready preparation of a neoprene compound that is practical to employ in commercial scale operations and that bonds readily to fluoroelastomer compounds.

The chloroprene polymer that must be used in the practice of this invention is a high molecular weight, mercaptan-modified polymer. One such polymer is known in the trade as neoprene type W. It has been found that sulfur-modified chloroprene polymers, for instance the product known in the trade as neoprene type GN, are not suitable in making the composite structures of this invention.

Chloroprene polymers suitable for use in making the laminated structures of this invention include both the homopolymers of chloroprene and its copolymers containing minor amounts (less than 20% of the total) of other polymerizable monomers, representative examples of which are styrene, acrylonitrile, isoprene, butadiene-1,3, and 2,3-dichlorobutadiene-1,3. These polymers are prepared by partial polymerization of the monomers in the presence of a $C_8$ to $C_{18}$ aliphatic mercaptan such as dodecyl mercaptan, by procedures such as those described in U.S. Patent 2,567,117. They have a number average molecular weight of at least 50,000 and normally are in the range 100,000 to 400,000. They are substantially completely soluble in aromatic solvents such as benzene and toluene.

An essential component of the neoprene compound is a silica filler of the high surface area type. A commonly avialable silica filler that is suitable for this purpose is "Hi-Sil" 233, although any equivalent silica filler may be used. It is necessary to use at least 30 parts of the silica filler for each 100 parts of neoprene. As much as 60 parts may be used, but about 40 parts is generally found to be the preferred concentration.

An epoxy resin must be incorporated in the neoprene compound. A resin of the type made by reaction of epichlorohydrin with bis-phenol A is suitable. The commercial products known as "Scotchweld" EC–1838B and "Epon" 828 are typical and readily available epoxy resins of this sort. It has been found that about 3 to 5 parts of epoxy resin must be used for each 100 parts of neoprene.

An additional critical feature of the neoprene compound used in making the composite structures of this invention is the use of a vulcanization accelerator that does not supply free sulfur to the system. Free sulfur interferes with the development of proper adhesion between the layers of neoprene and fluoroelastomer. The commonly used accelerators for neoprene that do not supply free sulfur, such as 2-mercaptoimidazoline and the alkyl thiuram disulfides can be used but give neoprene stocks that have relatively poor processing safety when compounded with the necessary silica and epoxy resin components. It has been found that accelerators of the trialkyl thiourea type, such as "Thiate E" (trimethyl thiourea) can be used to prepare neoprene compounds containing silica and epoxy resins that have quite satisfactory processing safety, and thus the trialkyl thiourea accelerators are preferred.

In addition to the above-described essential components of the neoprene portion of the composite structures of this invention, conventional materials such as magnesia, zinc oxide, calcium stearate, and suitable antioxidants are employed. Calcium oxide may also be used to impart superior high temperature resistance to the vulcanizate, and low molecular weight polyethylenes may be added as processing aids. The use of compounding ingredients of these types is well known to those skilled in the art.

It has been found, on the other hand, that certain frequently used neoprene compound ingredients must be avoided, because they interfere with development of adhesion with the fluoroelastomer compound. Carbon black, other than enough to impart color, processing oils of all types, and fluid plasticizers should not be used.

Typical fluoroelastomer components suitable for use in making the structures of this invention are the hexafluoropropene-vinylidene fluoride copolymers. The composition and method of making elastomers of this type are particularly pointed out in U.S. Patent 3,051,677. A preferred copolymer for use in this invention contains about 60% vinylidene fluoride and 40% hexafluoropropene. Hexafluoropropene-vinylidene fluoride-tetrafluoroethylene terpolymers, for instance those described in U.S. Patent 2,968,649 may also be used. It is preferred to use a terpolymer containing about 30% hexafluoropropene, about 45% vinylidene fluoride, and about 25% tetrafluoroethylene, although for some uses it may be desirable to use fluoroelastomers containing different proportions of the constituent monomers than these preferred proportions.

The fluoroelastomer layer is compounded by procedures well known in the art. Magnesia and a diamine-containing vulcanizing agent such as methylene bis(4,4'-cyclohexylamine)carbamate may be employed in the usual way and in the usual concentrations. Typical concentrations are 15 parts of magnesia and about 2 parts of the carbamate per 100 parts of fluoroelastomer. Calcium oxide or lead oxide may be substituted for the magnesia. Diamine sources including the carbamate salts and dialdimines are suitable. Carbon black may be employed in the fluoroelastomer compound, and 20 parts per 100 parts of fluoroelastomer is a suitable concentration. A low molecular weight fluoropolymer such as "Viton" LM may be included as a processing aid if desired, but liquid processing oils or plasticizers should be avoided.

Compounding and fabrication of composite articles of neoprene and fluoroelastomers according to the process of this invention can be carried out by the normal mixing and forming procedures well known to those skilled in the art. Hose and electrical cable, for instance, are made by cross-head extrusion of a jacket of neoprene over a first extruded layer of fluoroelastomer, or vice versa, each elastomer being compounded using standard mill or internal mixing equipment with the ingredients taught by the findings of this invention. The resulting composite structure is then cured by the well known lead press technique or by normal open steam curing. Gaskets, sealing strips, and other extruded elastomeric articles that can take advantage of the combined advantages of neoprene and fluoroelastomers can be made similarly.

The high level of adhesion achieved between neoprene and fluoroelastomers compounded according to this invention are particularly illustrated by the following examples of specific embodiments wherein parts and percentages are by weight unless otherwise indicated.

EXAMPLE 1

The formation and adhesive quality of a typical polychloroprene-fluoroelastomer composite stock of this invention is illustrated as follows:

(A) Preparation of neoprene layer composition.—The following materials are compounded together by means of a conventional mill mixing process to form a neoprene stock composition.

| Component: | Parts |
|---|---|
| Neoprene W | 100 |
| Calcium stearate | 4 |
| Magnesium oxide | 4 |
| Phenyl-alpha-naphthylamine | 2 |
| Epoxy resin ("Scotchweld 1838B") | 5 |
| Silica "Hi-Sil" 233 | 40 |
| Polyethylene [1] (AC 617A) | 6 |
| Zinc oxide | 5 |
| Calcium oxide | 10 |
| Tetramethyl thiuram disulfide | 0.75 |
| 2-mercaptoimidazoline | 0.75 |

[1] Low molecular weight polyethylene commercially available from Allied Chemical Corporation.

(B) Preparation of fluoroelastomer layer composition.—The following materials are compounded together by means of a conventional mill mixing process to form a fluoroelastomer stock composition:

| Component: | Parts |
|---|---|
| Hexafluoropropene-vinylidene fluoride-tetrafluoroethylene terpolymer | 100 |
| Magnesium oxide | 15 |
| MT carbon black | 20 |
| N,N'-dicinnamylidene-1,6-hexanediamine | 3 |

(C) Formation of neoprene-fluoroelastomer composite article.—Test specimens are made by superimposing 1" x 4" x 0.150" slabs of the neoprene and fluoroelastomer compositions of parts A and B and curing the assembly at 162° C. under a pressure of 600 lbs./sq. in. for 30 minutes.

(D) Interlamellar adhesive strength.—Adhesion between the layers of the article formed in part C is tested by determining the force required to strip the layers apart at a 180° angle in a Scott tester, with a 2"/minute rate of separation of the jaws of the tester. The laminate formed in part C showed an interlamellar adhesion of 43–50 pounds per linear inch of width.

EXAMPLE 2

The effect on adhesion of increasing the concentration of epoxy resin and of varying the silica concentration is illustrated as follows:

(A) Preparation of neoprene lamina composition.—Five samples (1–4), and a control sample outside the scope of the invention, are prepared. Each one is prepared by compounding together by a standard mill-mixing process the following components:

| Component: | Parts |
|---|---|
| Neoprene W | 100 |
| Calcium stearate | 4 |
| Magnesium oxide | 4 |
| Phenyl-alpha-naphthylamine | 2 |
| Polyethylene (AC 617A) | 4 |
| Zinc oxide | 5 |
| Calcium oxide | 10 |
| Tetramethyl thiuram disulfide | 0.5 |
| 2-mercaptoimidazoline | 0.75 |

In addition the following proportions of epoxy resin ("Scotchweld" 1838B) and silica are added to the neoprene samples.

| Sample No. | Epoxy resin | Silica |
|---|---|---|
| Control | | 40 |
| 1 | 3.2 | 40 |
| 2 | 4.25 | 40 |
| 3 | 5.0 | 40 |
| 4 | 5.0 | 30 |

(B) Preparation of fluoroelastomer lamina composition.—Five separate samples of the fluoroelastomer are prepared by compounding together the following ingredients.

| Component: | Parts |
|---|---|
| Hexafluoropropene-vinylidene fluoride-tetrafluoroethylene terpolymer | 90 |
| Low molecular weight fluoroelastomer ("Viton" LM) | 10 |
| Calcium oxide | 15 |
| MT carbon black | 20 |
| Alicyclic amine salt | 1.9 |

(C) Preparation of neoprene-fluoroelastomer composite articles and adhesiveness thereof.—The fluoroelastomer samples of part B are adhered to the corresponding neoprene samples of part A exactly as described in part C of Example 1. The resulting five composite specimens are tested for adhesion as in part D of Example 1. Results are as follows:

| Sample No.: | Adhesion |
|---|---|
| Control | 5 |
| 1 | 11 |
| 2 | 48–52 |
| 3 | 60 |
| 4 | 24 |

It is generally found in commercial practice that practically useful laminates must have adhesion of about 10 pounds as measured by the above test. For use under severe conditions higher values are often desired. Thus it can be seen that by controlling the concentration of epoxy resin and silica filler in the neoprene lamina composition, adhesion can be controlled at any desired level, and that a concentration af about 3 parts of epoxy resin is necessary to bring the adhesion into the useful range of over 10 pounds.

EXAMPLE 3

The relative independence of adhesion from the compounding ingredients used in vulcanizing the fluoroelastomer component is illustrated as follows:

(A) Prepartaion of neoprene lamina composition.—Four separate samples (1–4) of the same neoprene composition are prepared by compounding together the following ingredients by a mill mixing process:

| Component: | Parts |
|---|---|
| Neoprene W | 100 |
| Calcium stearate | 4 |
| Magnesium oxide | 4 |
| Phenyl-alpha-naphthylamine | 2 |
| Epichlorohydrin-bis-phenol A resin ("Epon" 828) | 5 |
| Silica "Hi-Sil" 233 | 40 |
| Polyethylene (AC–617A) | 4 |
| Zinc oxide | 5 |
| Calcium oxide | 10 |
| Trialkyl thiourea accelerator | 2 |

(B) Preparation of fluoroelastomer lamina composition.—Four separate samples (1–4) of a fluoroelastomer composition are prepared by compounding together the following components:

| Component | Parts in Sample No. | | | |
|---|---|---|---|---|
| | 1 | 2 | 3 | 4 |
| Hexafluoropropene-vinylidene fluoride-tetrafluoroethylene terpolymer | 100 | 100 | 100 | 100 |
| Magnesium oxide | 15 | | | |
| Calcium oxide | | 15 | | 15 |
| Litharge | | | 15 | |
| MT carbon black | 20 | 20 | 20 | 20 |
| Hexamethylene diamine carbamate | | | | 1.5 |
| N,N'-dicinnamylidene-1,6-hexanediamine | 2 | 2 | 2 | 2 |

(C) Preparation and measure of adhesiveness of neoprene-fluoroelastomer composite article.—The laminates of parts A and B above are adhered together by the method of Example 1. The adhesion of the article is then tested by the method of part C of Example 1. Results are as follows:

| Sample No.: | Adhesion |
|---|---|
| 1 | 69 |
| 2 | 59 |
| 3 | 42 |
| 4 | 49 |

As is readily apparent from the foregoing examples good adhesion is obtained by merely placing the fluoroelastomer and neoprene laminae together under the proper pressure and temperature conditions. As the results indicate, the strength of adhesion generally improves as the amount of epoxy resin and silica in the neoprene layer increases with optimum results occurring when about 5 parts of epoxy resin and 40 parts of silica are present.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for forming a composite article consisting essentially of a mercaptan-modified polymer of chloroprene and a fluoroelastomer in direct adherent relation, comprising the steps of incorporating about 3–5 parts by weight of an epoxy resin and about 30–60 parts by weight of a reinforcing silica filler into said mercaptan-modified polymer of chloroprene, placing the resulting polychloroprene stock in physical direct contact with a fluoroelastomer and vulcanizing the resulting assembled structure.

2. The process of claim 1 in which the epoxy resin is the type made by reaction of epichlorohydrin with bis-phenol A and the fluoroelastomer is selected from the group consisting of hexafluoropropene-vinylidene fluoride copolymers and hexafluoropropene-vinylidene fluoride-tetra-fluoroethylene terpolymers.

3. An adhered composite article consisting essentially of a layer of high molecular weight mercaptan-modified chloroprene polymer stock having incorporated therein about 3–5 parts of an epoxy resin and at least about 30 to 60 parts of a reinforcing silica filler, and a fluoroelastomer stock in direct adherent relation with said chloroprene polymer stock.

4. The article of claim 3 in which the epoxy resin is the type made by reaction of epichlorohydrin with bis-phenol A and the fluoroelastomer is selected from the group consisting of hexafluoropropene-vinylidene fluoride copolymers and hexafluoropropene-vinylidene fluoride-tetrafluoroethylene terpolymers.

References Cited

UNITED STATES PATENTS

| 2,580,546 | 1/1952 | Hobson | 277—232 |
| 2,597,976 | 5/1952 | Cousins | 277—228 |
| 2,809,130 | 10/1057 | Rappaport | 161—184 X |
| 2,868,575 | 1/1959 | Hawxhurst | 288—16 |
| 3,124,548 | 3/1964 | Yaroch | 161—184 X |
| 3,315,380 | 4/1967 | Mack et al. | 161—184 X |

HAROLD ANSHER, *Primary Examiner.*

U.S. Cl. X.R.

161—188, 189, 254, 256; 156—306, 330, 333